(12) United States Patent
Fish et al.

(10) Patent No.: US 7,605,635 B2
(45) Date of Patent: Oct. 20, 2009

(54) THRESHOLD CONTROL CIRCUITRY FOR MULTIPLE CURRENT SIGNAL RECEIVERS

(75) Inventors: Adam Fish, Portland, ME (US); John Lynch, Spencerport, NY (US)

(73) Assignee: National Semiconductor Corporation, Santa Clara, CA (US)

( * ) Notice: Subject to any disclaimer, the term of this patent is extended or adjusted under 35 U.S.C. 154(b) by 162 days.

(21) Appl. No.: 11/753,266

(22) Filed: May 24, 2007

(65) Prior Publication Data

US 2008/0290907 A1     Nov. 27, 2008

(51) Int. Cl.
G05F 1/10    (2006.01)
(52) U.S. Cl. .................. 327/530; 326/86; 327/103
(58) Field of Classification Search .............. 326/86; 327/103, 108, 403, 404, 530, 534, 535
See application file for complete search history.

(56) References Cited

U.S. PATENT DOCUMENTS

| | | | |
|---|---|---|---|
| 5,512,853 A * | 4/1996 | Ueno et al. ............ | 327/333 |
| 5,856,750 A * | 1/1999 | Koseki ................... | 327/72 |
| 6,278,312 B1 * | 8/2001 | Dabral et al. ........... | 327/310 |
| 6,424,177 B1 * | 7/2002 | Hairapetian ............ | 326/86 |
| 6,801,584 B1 * | 10/2004 | Williams ................ | 375/316 |
| 7,208,972 B2 * | 4/2007 | Dreps et al. ............. | 326/26 |
| 7,310,005 B2 * | 12/2007 | Chang et al. ............ | 326/82 |
| 7,403,040 B2 * | 7/2008 | Park et al. ............... | 326/86 |
| 2006/0002483 A1 | 1/2006 | Kim | |
| 2007/0019686 A1 | 1/2007 | Belk et al. | |
| 2007/0241737 A1 | 10/2007 | Yen et al. | |

OTHER PUBLICATIONS

German Search Report for German Application No. 10 2008 024 522.4 dated May 21, 2008, 4 pp.

* cited by examiner

*Primary Examiner*—Jeffrey S Zweizig
(74) *Attorney, Agent, or Firm*—Vedder Price P.C.

(57) ABSTRACT

Calibration circuitry and method for maintaining constant signal detection thresholds for multiple signal receivers that receive data signals in the form of current signals. A value of one of the incoming current signals having a predetermined signal pattern is detected and used to generate threshold control signals for each of the signal receivers to control the data signal detection thresholds.

19 Claims, 4 Drawing Sheets

THRESHOLD CONTROL CIRCUITRY FOR MULTIPLE CURRENT SIGNAL RECEIVERS

BACKGROUND OF THE INVENTION

1. Field of the Invention

The present invention relates to control circuitry for establishing and maintaining detection thresholds for data signal receivers, and in particular, to such circuits for establishing and maintaining signal thresholds for current signal receivers.

2. Related Art

As interface circuits operate with lower power supply voltages and lower magnitude signals, maintaining signal thresholds for properly detecting the states of the received signals becomes increasingly problematic. As a signal magnitudes continue to decrease, the smaller dynamic ranges make it all the more important to be able to consistently establish and maintain proper signal detection thresholds substantially irrespective of signal link conditions.

SUMMARY OF THE INVENTION

In accordance with the presently claimed invention, calibration circuitry and method are provided for maintaining constant signal detection thresholds for multiple signal receivers that receive data signals in the form of current signals. A value of one of the incoming current signals having a predetermined signal pattern is detected and used to generate threshold control signals for each of the signal receivers to control the data signal detection thresholds.

In accordance with one embodiment of the presently claimed invention, control circuitry for controlling a plurality of signal thresholds for a plurality of current signal receivers includes:

a plurality of current signal receiver circuits each of which is responsive to reception of a respective one of a plurality of threshold control signals and a respective one of a plurality of current signals by providing a respective one of a plurality of data signals, wherein each one of the plurality of data signals corresponds to a respective one of the plurality of current signals; and control circuitry coupled to the plurality of current signal receiver circuits and responsive to reception of at least a portion of one of the plurality of current signals by providing the plurality of threshold control signals, wherein each one of the plurality of threshold control signals has a respective value related to the one of the plurality of current signals.

In accordance with another embodiment of the presently claimed invention, control circuitry for controlling a plurality of signal thresholds for a plurality of current signal receivers includes:

a plurality of current signal receiver means each of which is for receiving a respective one of a plurality of threshold control signals and a respective one of a plurality of current signals and providing a respective one of a plurality of data signals, wherein each one of the plurality of data signals corresponds to a respective one of the plurality of current signals; and controller means for receiving at least a portion of one of the plurality of current signals and providing the plurality of threshold control signals, wherein each one of the plurality of threshold control signals has a respective value related to the one of the plurality of current signals.

In accordance with still another embodiment of the presently claimed invention, a method for controlling a plurality of signal thresholds for a plurality of current signal receivers includes:

receiving a plurality of current signals including a selected current signal;

processing at least a portion of the selected current signal to provide a plurality of threshold control signals, wherein each one of the plurality of threshold control signals has a respective value related to the selected current signal; and detecting the plurality of current signals in accordance with the plurality of threshold control signals to provide a plurality of data signals, wherein each one of the plurality of data signals corresponds to a respective one of the plurality of current signals.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
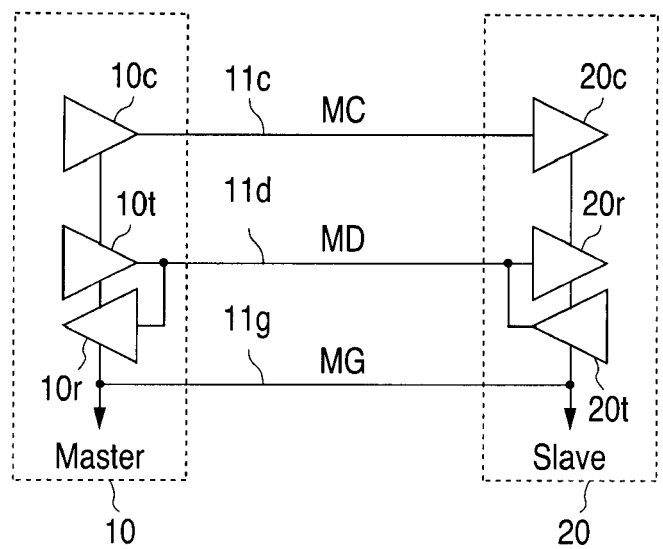
FIG. 1 is a functional block diagram of a current signal link for which threshold control circuitry in accordance with the presently claimed invention is advantageous.

Referring to FIG. 1, a low power interface circuit using small magnitude current signaling for which threshold control circuitry in accordance with the presently claimed invention is advantageous includes master circuitry 10 and slave circuitry 20 sharing a common reference, or ground, connection 11g, and communicating via a half-duplex data signal 11d and clock signal 11c. The clock signal 11c is transmitted by a line driver, or transmitter, 10c in the master 10, and received by a receiver 20c in the slave 20. A transmitter 10t and receiver 10r in the master 10 and a similar receiver 20r and transmitter 20t in the slave 20 provide for the half-duplex communication of the data signal 11d. Low magnitude current signaling is used for low power operation and low electromagnetic interference (EMI), with the two binary logic states being determined by the magnitude of the current being sourced from the receiver to the transmitter. (The two currents associated with the two logic states can be visualized as an AC current riding on a DC bias current.) In accordance with a preferred embodiment, the two logic level currents are 150 microamperes and 750 microamperes, and are considered to be a signal of +/−300 microamperes riding on a DC bias current of 450 microamperes. The higher current (e.g., 750 microamperes) is considered a logic low level, while the lower current (e.g., 150 microamperes) is considered as the logic high level.

Figure 2:
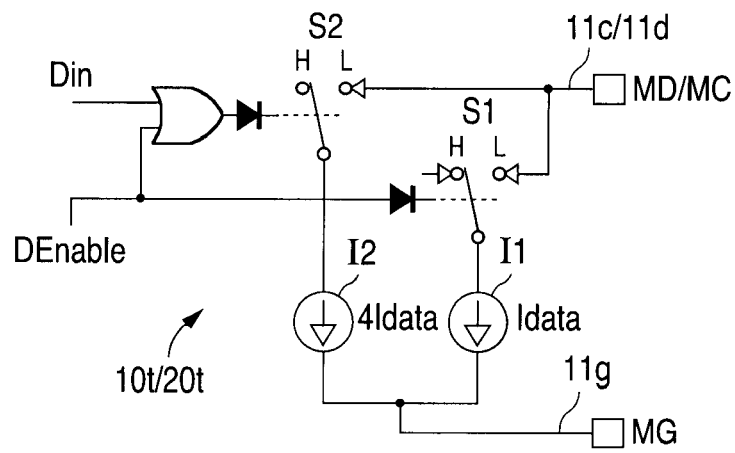
FIG. 2 is a functional block diagram of the signal transmitters of FIG. 1.

Referring to FIG. 2, the line driver 10t/20t uses a two-state current sink, with the magnitudes of the currents being determined by the input state. The line driver 10t/20t does not establish the voltage on the line; this is established by the receiver 10r/20r. This allows the line driver to accommodate multiple receiver voltages, and allows for the line drivers and receivers to be operated with different power supplies.

When the internal enable signal is a logic low, switch S1 connects current source I1 to the signal line 11c/11d, thereby causing current IDATA to be sunk by the driver 10t/20t. When the internal data signal is low, switch S2 is also connected to the signal line 11c/11d, thereby causing a sum of currents of IDATA and 4IDATA to be sunk by the driver 10t/20t. When the internal data signal is a logic high, switch S2 opens, thereby causing only current IDATA to be sunk from the signal line 11c/11d. When both switches S1, S2 are open, the driver 10t/20t is in its off state, and zero current is sunk from the signal line 11c/11d. Accordingly, a logic low is the higher current magnitude, i.e., the sum of currents I1 and I2, and a logic high is the lower current magnitude, i.e., current I1 only.

Figure 3:
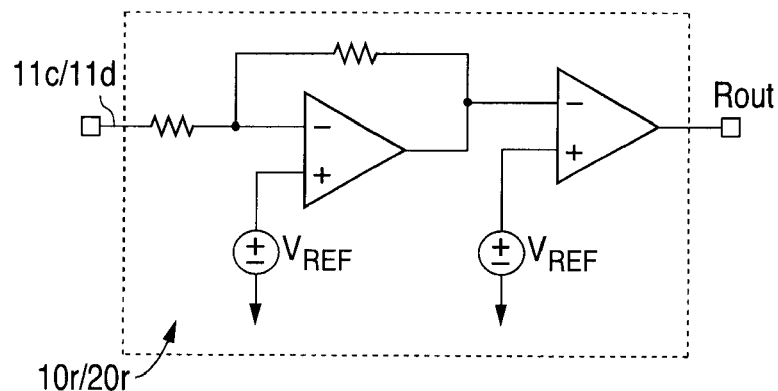
FIG. 3 is a functional block diagram of the signal receivers of FIG. 1.

Referring to FIG. 3, the receiver circuitry 10r/20r detects the current state on the signal line 11c/11d, converts that current to a voltage, and amplifies that voltage to standard logic level, regardless of whether signal current is present or not. The receiver circuitry 10r/20r also provides line termination.

Figure 4:
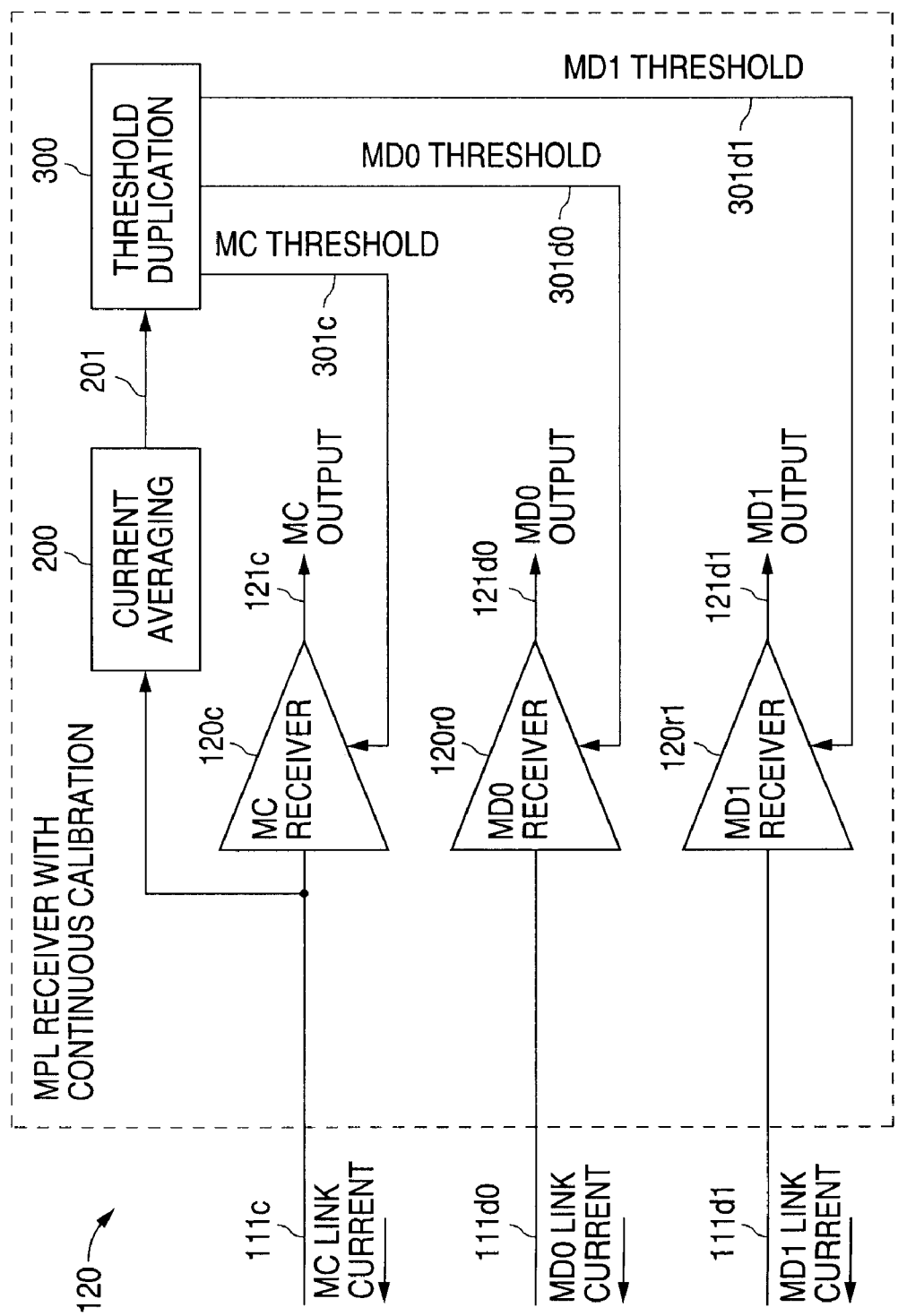
FIG. 4 is a functional block diagram of a current signal receiver system using threshold control circuitry in accordance with the presently claimed invention.

Referring to FIG. 4, a slave circuit 120 with current signal receivers 120c, 120r0, 120r1 controlled in accordance with one embodiment of the presently claimed invention receive the signal, or link, currents 111c, 111d0, 111d1 being sunk by the transmitters, as discussed above, detect these signal currents and provide corresponding clock 121c and data 121d0, 121d1 signals. As discussed in more detail below, the clock signal current 111c (which is normally periodic and, therefore, more susceptible to predictable averaging) is sampled by current averaging circuitry 200. An averaged current signal 201 is provided to threshold duplication circuitry 300 (e.g., a current mirror circuit) which provides replicated, or mirrored, signal currents which serve as threshold control signals 301c, 301d0, 301d1 for the receiver circuits 120c, 120r0, 120r1.

The current thresholds for the receivers 120c, 120r0, 120r1 are set at the middle value of the currents 111c, 111d0, 111d1 being conveyed via the link. This threshold determines what signal current corresponds to a logic high or logic low on the link. For example, with a logic high current defined as a 1i and the logic low as defined as a 5i current, the threshold is ideally set at a current of 3i.

Figure 5:
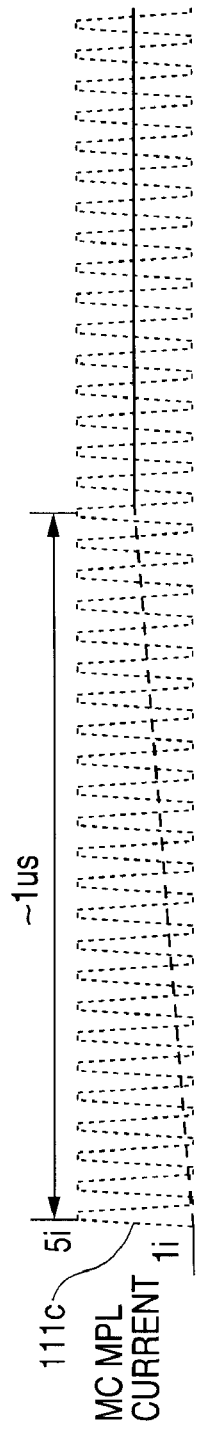
FIG. 5 is a signal diagram depicting the signal averaging of threshold control circuitry in accordance with the presently claimed invention.

Referring to FIG. 5, a preferred embodiment of the current averaging circuitry 200 has a finite response with a settling time of approximately of one microsecond. This allows lower signal frequencies to be received with a stable threshold, while still maintaining the ability to track the calibration point.

Figure 6:
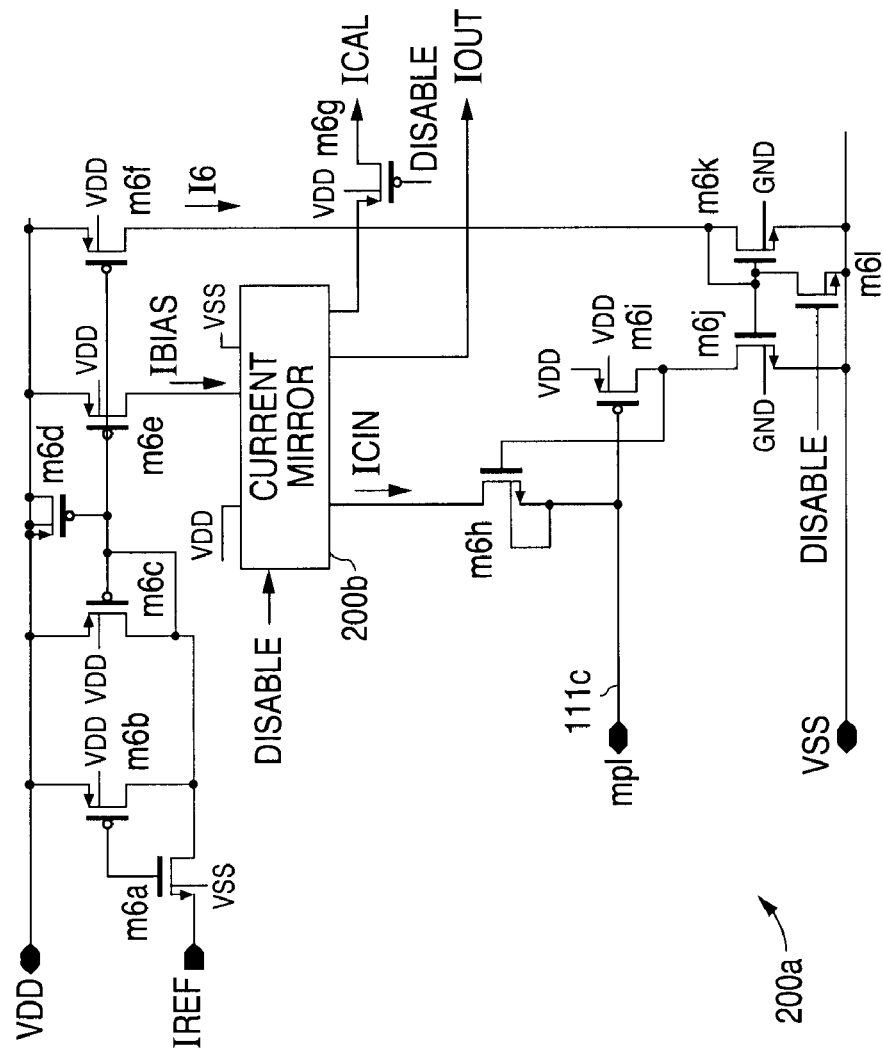
FIG. 6 is a circuit diagram of a preferred embodiment of an input stage for the averaging circuit of FIG. 4.

Referring to FIG. 6, a preferred embodiment 200a of the input stage of the current averaging circuitry 200 includes sampling circuitry substantially as shown. Metal oxide semiconductor field effect transistors (MOSFETs) M6a, M6b, M6c, M6d, M6e, M6f are biased by the positive power supply rail VDD and a reference current IREF to provide a bias current IBIAS for a current mirror circuit (discussed in more detail below) and another bias current I6. The clock signal current 111c is conveyed by transistor M6h which provides a low impedance termination. This produces a sample current ICIN which is provided to the current mirror 200b. Transistor M6h is biased by amplifier and current mirror circuitry formed by transistors M6i, M6j and M6k. Transistor M6l provides for disabling this bias circuitry in accordance with a disable control signal DISABLE. (This disable control signal is also used in other areas of the circuitry described herein, and, when activated, disables operation of this averaging circuitry 200.)

Transistor M6g is used for gating the calibration current ICAL provided by the current mirror circuit in accordance with the disable control signal DISABLE.

Figure 7:
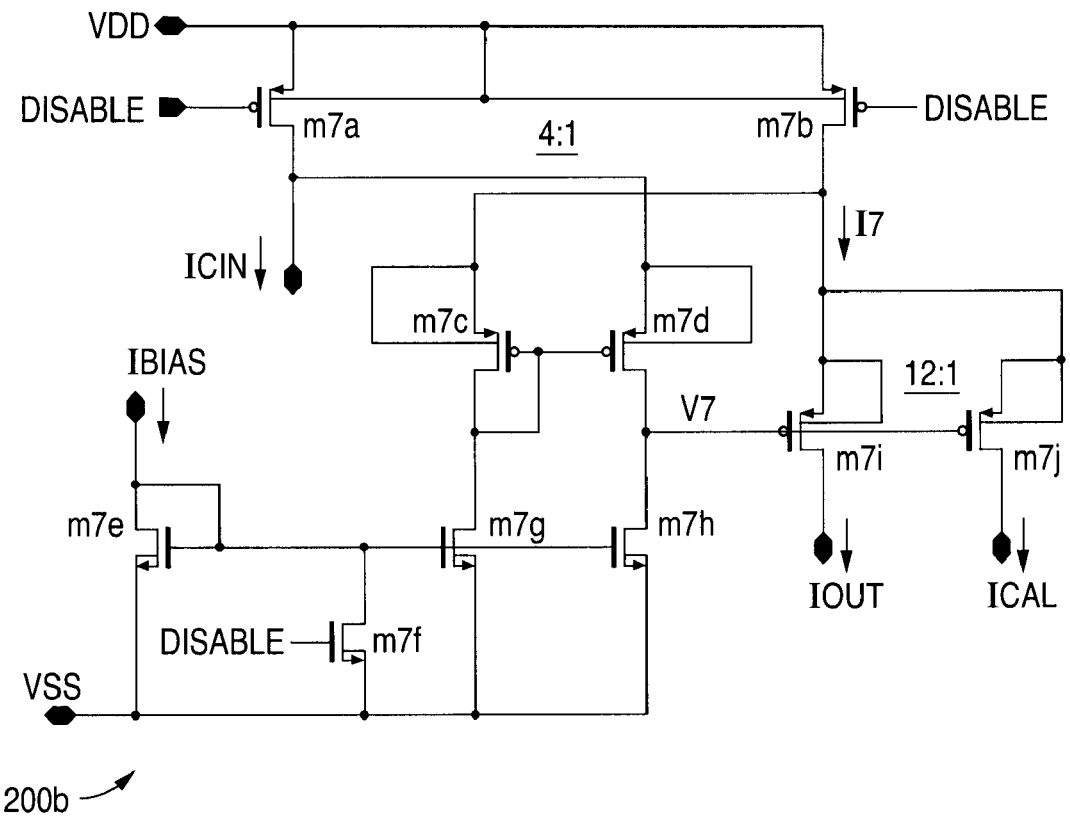
FIG. 7 is a circuit schematic of a preferred embodiment of the current mirror circuitry of FIG. 6.

Referring to FIG. 7, a preferred embodiment of the current mirror circuit 200b of FIG. 6 is implemented substantially as shown. Disablement control transistors M7a, M7b are biased by the positive power supply rail VDD and provide a current scaling ratio of 4:1 so that the magnitude of the output signal 17 is approximately one-fourth the magnitude of the input current ICIN. The bias current IBIAS is used by diode-connected transistor M7e to bias transistors M7c, M7d, M7g and M7h, which, in turn, provide biasing for input current scaling transistors M7a and M7b, and a bias voltage V7 for output current mirror and scaling transistors M7i and M7j. These output transistors M7i, M7j should be well matched and have relative device characteristics (e.g., channel widths) such that the ratio of the calibration current ICAL to the output current IOUT is 1:12. As a result, the calibration current ICAL has a magnitude scaled in a ratio of 1:48 relative to the magnitude of the input current ICIN.

Figure 8:
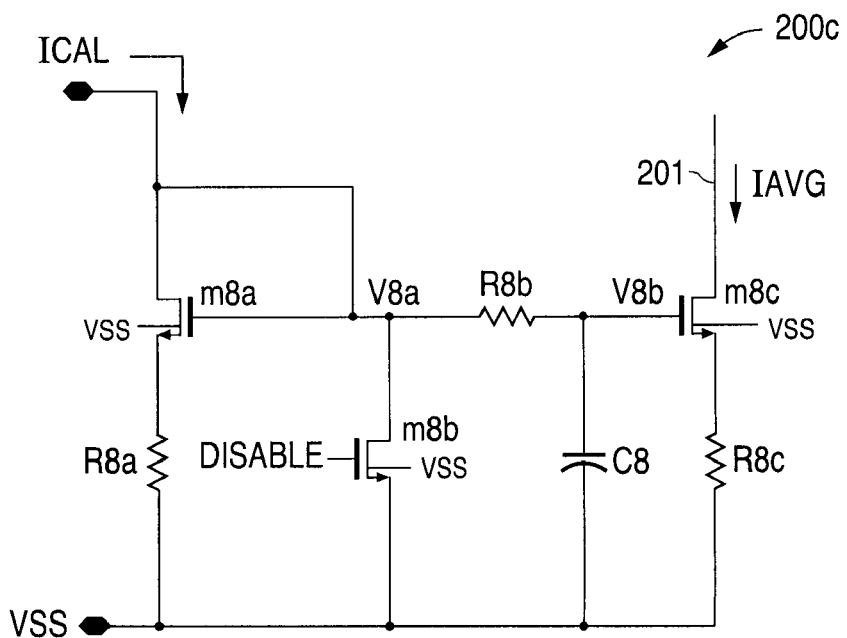
FIG. 8 is a circuit schematic of a preferred embodiment of an output stage for the averaging circuit of FIG. 4.

Referring to FIG. 8, a preferred embodiment of the output stage 200c of the current averaging circuitry 200 (FIG. 4) is implemented as a filtered current mirror circuit substantially as shown. The calibration current ICAL is received by a diode-connected input transistor M8a, thereby causing a corresponding voltage V8a to be produced its gate electrode, due to the voltage drop across its source resistor R8a. This voltage V8a is filtered by a low pass filter formed by series resistor R8b and shunt capacitor C8. The resulting filtered voltage V8b drives the gate electrode of output transistors M8c to produce a corresponding output current IAVG, which is substantially equal to a scaled average of the original clock signal current 111c (FIG. 4). The source resistors R8a, R8c provide degeneration to help the response to remain substantially linear.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including receiver and controller circuitry for controlling a plurality of signal thresholds for a plurality of current signal receivers, comprising:

a plurality of current signal receiver circuits each of which is responsive to reception of a respective one of a plurality of threshold control signals and a respective one of a plurality of current signals by providing a respective one of a plurality of data signals, wherein each one of said plurality of data signals corresponds to a respective one of said plurality of current signals; and control circuitry coupled to said plurality of current signal receiver circuits and responsive to reception of at least a portion of one of said plurality of current signals by providing said plurality of threshold control signals, wherein each one of said plurality of threshold control signals has a respective value related to said one of said plurality of current signals.

2. The apparatus of claim 1, wherein said control circuitry comprises:

processing circuitry coupled to one of said plurality of current signal receiver circuits and responsive to said reception of at least a portion of one of said plurality of current signals by providing a processed current signal related to a mean value of said at least a portion of one of said plurality of current signals; and distribution circuitry coupled to said processing circuitry and said plurality of current signal recover circuits, and responsive to reception of said processed current signal by providing said plurality of threshold control signals.

3. The apparatus of claim 2, wherein said processing circuitry comprises:

sampling circuitry responsive to said reception of at least a portion of one of said plurality of current signals by providing at least a corresponding sample current signal; and averaging circuitry coupled to said sampling circuitry and responsive to said sample current signal by providing said processed current signal.

4. The apparatus of claim 3, wherein said averaging circuitry comprises:

input circuitry responsive to reception of said sample current signal by providing an intermediate signal;

filter circuitry coupled to said input circuitry and responsive to reception of said intermediate signal by providing a filtered signal; and output circuitry coupled to said filter circuitry and responsive to reception of said filtered signal by providing said processed current signal.

5. An apparatus including receiver and controller circuitry for controlling a plurality signal thresholds for a plurality of current signal receivers comprising:

a plurality of current signal receiver circuits each of which is responsive to reception of a respective one of a plurality of threshold control signals and a respective one of a plurality of current signals by providing a respective one of a plurality of data signals, wherein each one of said plurality of data signals corresponds to a respective one of said plurality of current signals; and control circuitry coupled to said plurality of current signal receiver circuits and responsive to reception of at least a portion of one of said plurality of current signals by providing said plurality of threshold control signals, wherein each one of said plurality of threshold control signals has a respective value related to said one of said plurality of current signals and said control circuitry includes processing circuitry coupled to one of said plurality of current signal receiver circuits, responsive to said reception of at least a portion of one of said plurality of current signals by providing a processed current signal related to a mean value of said at least a protion of one of said plurality of current signals, and including sampling circuitry responsive to said reception of at least a portion of one of said plurality of current signals by providing at least a corresponding sample current signal, and including first current mirror circuitry responsive to said reception of at least a portion of one of said plurality of current signals by providing a first mirrored current related to said at least a portion of one of said plurality of current signals, and second current mirror circuitry responsive to said reception of said first mirrored current by providing, as said sample current signal, a second mirrored current related to said first mirrored current, averaging circuitry coupled to said sampling circuitry and responsive to said sample current signal by providing said processed current signal, and distribution circuitry coupled to said processing circuitry and said plurality of current signal receiver circuits, and responsive to reception of said processed current signal by providing said plurality of threshold signals.

6. The apparatus of claim 5, wherein said averaging circuitry comprises a filtered current mirror circuit.

7. The apparatus of claim 5, wherein said averaging circuitry comprises:

input circuitry responsive to reception of said sample current signal by providing an intermediate signal;

filter circuitry coupled to said input circuitry and responsive to reception of said intermediate signal by providing a filtered signal; and output circuitry coupled to said filter circuitry and responsive to reception of said filtered signal by providing said processed current signal.

8. An apparatus including receiver and controller circuitry for controlling a plurality of signal thresholds for a plurality of current signal receivers, comprising:

a plurality of current signal receiver circuits each of which is responsive to reception of a respective one of a plurality of threshold control signals and a respective one of a plurality of current signals by providing a respective one of a plurality of data signals, wherein each one of said plurality of data signals corresponds to a respective one of said plurality of current signals; and control circuitry coupled to said plurality of current signal receiver circuits and responsive to reception of at least a portion of one of said plurality of current signals by providing said plurality of threshold control signals, wherein each one of said plurality of threshold control signals has a respective value related to said one of said plurality of current signals, and said control circuitry includes processing circuitry coupled to one of said plurality of current signal receiver circuits, responsive to said reception of at least a portion of one of said plurality of current signal by providing a processed current signal related to a mean value of said at least a portion of one of said plurality of current signals and including sampling circuitry responsive to said reception of at least a portion of one of said plurality of current signals by providing at least a corresponding sample current signal, averaging circuitry coupled to sail sampling circuitry, responsive to said sample current signal by providing said processed current signal, and including a filtered current mirror circuit, and distribution circuitry coupled to said processing circuitry and said plurality of current signal receiver circuits, and responsive to reception of said processed current signal by providing said plurality of threshold control signals.

9. An apparatus including receiver and controller circuitry for controlling a plurality of signal thresholds for a plurality of current signal receivers, comprising:

a plurality of current signal receiver circuits each of which is responsive to reception of a respective one of a plurality of threshold control signals and a respective one of a plurality of current signals by providing a respective one of a plurality of data signals, wherein each one of said plurality of data signals corresponds to a respective one of said plurality of current signals; and control circuitry coupled to said plurality of current signal receiver circuits and responsive to reception of at least a portion of one of said plurality of current signals by providing said plurality of threshold control signals, wherein each one of said plurality of threshold control signals has a respective value related to said one of said plurality of current signals, and said control circuitry includes processing circuitry coupled to one of said plurality of current signal receiver circuits and responsive to said reception of at least a portion of one of said plurality of current signals by providing a processed current signal related to a mean value of said at least a portion of one of said plurality of current signals, and distribution circuitry coupled to said processing circuitry and said plurality of current signal receiver circuits, responsive to reception of said processed current signal by providing said plurality of threshold control signals, and including current mirror circuitry responsive to reception of said processed current signal by providing a plurality of mirrored current signals as said plurality of threshold control signals.

10. An apparatus including receiver and controller circuitry for controlling a plurality of signal thresholds for a plurality of current signal receivers, comprising:

a plurality of current signal receiver circuits each of which is responsive to reception of a respective one of a plurality of threshold control signals and a respective one of a plurality of current signals by providing a respective one of a plurality of data signals, wherein each one of said plurality of data signals corresponds to a respective one of said plurality of current signals; and control coupled to said plurality of current signal receiver circuits and responsive to reception of at least a portion of one of said plurality of current signals by providing said plurality of threshold control signals, wherein each one of said plurality of threshold control signals has a respective value related to said one of said plurality of current signals, and said control circuitry includes input current mirror circuitry responsive to said reception of at least a portion of one of said plurality of current signals by providing an input mirrored current related to said at least a portion of one of said plurality of current signals, filtered current mirror circuitry coupled to said input current mirror circuitry and responsive to reception of said input mirrored current by providing a filtered mirrored current related to mean value of said input mirrored current, and output current mirror circuitry coupled to said filtered current mirror circuitry and responsive to reception of said filtered mirrored current by providing a plurality of output mirrored current signals as said plurality of threshold control signals.

11. An apparatus including receiver and controller circuitry for controlling a plurality of signal thresholds for a plurality of current signal receivers, comprising:

a plurality of current signal receiver means each of which is for receiving a respective one of a plurality of threshold control signals and a respective one of a plurality of current signals and providing a respective one of a plurality of data signals, wherein each one of said plurality of data signals corresponds to a respective one of said plurality of current signals; and controller means for receiving at least a portion of one of said plurality of current signals and providing said plurality of threshold control signals, wherein each one of said plurality of threshold control signals has a respective value related to said one of said plurality of current signals.

12. A method for controlling a plurality of signal thresholds for a plurality of current signal receivers, comprising:

receiving a plurality of current signals including a selected current signal;

processing at least a portion of said selected current signal to provide a plurality of threshold control signals, wherein each one of said plurality of threshold control signals has a respective value related to said selected current signal; and detecting said plurality of current signals in accordance with said plurality of threshold control signals to provide a plurality of data signals, wherein each one of said plurality of data signals corresponds to a respective one of said plurality of current signals.

13. The method of claim 12, wherein said processing at least a portion of said selected current signal to provide a plurality of threshold control signals comprises:

processing said at least a portion of one of said plurality of current signals to provide a processed current signal related to a mean value of said at least a portion of one of said plurality of current signals; and generating said plurality of threshold control signals in accordance with said processed Current signal.

14. The method of claim 13, wherein said processing said at least a portion of one of said plurality of current signals to provide a processed current signal related to a mean value of said at least a portion of one of said plurality of current signals comprises:

sampling said selected current signal to provide at least a corresponding sample current signal; and averaging said sample current signal to provide said processed current signal.

15. The method of claim 12, wherein said detecting said plurality of current signals in accordance with said plurality of threshold control signals to provide a plurality of data signals comprises comparing each of said plurality of current signals with a respective one of said plurality of threshold control signals.

16. A method for controlling a plurality of signal thresholds for a plurality of current signal receivers, comprising:

receiving a plurality of current signals including a selected current signal;

processing at least a portion of said selected current signal to provide a plurality of threshold control signals by processing said at least a portion of one of said plurality of current signals to provide a processed current signal related to a mean value of said at least a portion of one of said plurality of current signals by sampling said selected current signal to provide at least a corresponding sample current signal by mirroring at least a portion of said selected current signal, and averaging said sample current signal to provide said processed current signal, and generating said plurality of threshold control signals in accordance with said processed current signal, wherein each one of said plurality of threshold control signals has a respective value related to said selected current signal; and detecting said plurality of current signals in accordance with said plurality of threshold controls signals to provide a plurality of data signals, wherein each one of said plurality of data signals corresponds to a respective one of said plurality of current signals.

17. The method of claim 16, wherein said averaging said sample current signal to provide said processed current signal comprises filtering at least a portion of said selected current signal.

18. The method of claim 14, wherein said averaging said sample current signal to provide said processed current signal comprises filtering at least a portion of said selected current signal.

19. A method for controlling a plurality of signal thresholds for a plurality of current signal receivers, comprising:

receiving a plurality of current signals including a selected current signal:

processing at least a portion of said selected current signal to provide a plurality of threshold control signals by processing said at least a portion of one of said plurality of current signals to provide a processed current signal related to a mean value of said at least a portion of one of said plurality of current signals, and generating said plurality of threshold control signals in accordance with said processed current signal by mirroring said processed current signal, wherein each one of said plurality of threshold control signals has a respective value related to said selected current signal; and detecting said plurality of current signals in accordance with said plurality of threshold control signals to provide a plurality of data signals wherein each one of said plurality of data signals corresponds to a respective one of said plurality of current signals.

* * * * *

UNITED STATES PATENT AND TRADEMARK OFFICE
CERTIFICATE OF CORRECTION

PATENT NO. : 7,605,635 B2  Page 1 of 1
APPLICATION NO. : 11/753266
DATED : October 20, 2009
INVENTOR(S) : Adam Fish et al.

It is certified that error appears in the above-identified patent and that said Letters Patent is hereby corrected as shown below:

Column 4, Line 44
Please delete "17 is approximately one-fourth..."
and insert -- I7 is approximately one-fourth -- in its place.

Column 7, Line 12
Please delete "of current signal by providing"
and insert -- of current signals by providing -- in its place.

Column 7, Line 14
Please delete "of current signals and including"
and insert -- of current signals, and including -- in its place.

Column 8, Line 65
Please delete "said processed Current signal."
and insert -- said processed current signal. -- in its place.

Column 10, Line 2
Please delete "of threshold controls signal"
and insert -- of threshold control signal -- in its place.

Signed and Sealed this

Twenty-fourth Day of November, 2009

David J. Kappos
*Director of the United States Patent and Trademark Office*